United States Patent [19]

Stowers

[11] Patent Number: 5,492,145
[45] Date of Patent: Feb. 20, 1996

[54] ANTI-SYPHON FLUID CONTROL VALVE APPARATUS AND METHOD

[75] Inventor: Scott B. Stowers, Sandy, Utah

[73] Assignee: Environmental System & Solutions, Inc., Sandy, Utah

[21] Appl. No.: 311,865

[22] Filed: Sep. 26, 1994

Related U.S. Application Data

[62] Division of Ser. No. 110,089, Aug. 20, 1993, Pat. No. 5,404,898.

[51] Int. Cl.$^6$ .............................. F16K 24/02; E03C 1/10
[52] U.S. Cl. .......................... 137/218; 251/96; 251/287; 251/304
[58] Field of Search .............................. 137/218; 251/96, 251/287, 304

[56] References Cited

U.S. PATENT DOCUMENTS

| | | |
|---|---|---|
| 2,325,956 | 8/1943 | Holtman. |
| 2,584,436 | 2/1952 | Donaldson. |
| 2,590,386 | 5/1952 | Dobrick. |
| 2,814,304 | 11/1957 | Sloan. |
| 2,829,538 | 4/1958 | Mueller ................................. 251/96 X |
| 2,850,034 | 9/1958 | Svabek, Jr. et al.. |
| 2,990,843 | 7/1961 | Smith. |
| 3,700,178 | 10/1972 | Verley. |
| 3,788,342 | 1/1974 | Milette et al.. |
| 4,399,947 | 8/1983 | Spelber et al.. |
| 4,405,159 | 9/1983 | Spelber. |
| 4,410,001 | 10/1983 | Goguen. |
| 4,553,560 | 11/1985 | Tucker et al.. |
| 4,573,642 | 5/1986 | Spelber. |
| 4,589,438 | 5/1986 | Breda. |
| 4,635,848 | 1/1987 | Little. |
| 4,951,702 | 8/1990 | Brotcke. |
| 5,022,429 | 6/1991 | Rollini et al.. |
| 5,038,814 | 8/1991 | Gayton et al.. |
| 5,060,687 | 10/1991 | Gayton. |
| 5,063,619 | 11/1991 | Ross et al.. |
| 5,125,429 | 6/1992 | Ackroyd et al.. |

*Primary Examiner*—Gerald A. Michalsky
*Attorney, Agent, or Firm*—Thorpe North & Western

[57] ABSTRACT

An anti-syphon valve comprises a base pipe having inlet and outlet legs and a valve seat, disposed at the top of the base pipe within a valve stem post, which can be rotated selectively to block the inlet leg (closed position) or open it (open position). A metering peg extends from the valve stem post into a receptacle in the valve seat. Inlet and outlet passages corresponding to the inlet and outlet legs are disposed above the seat, and a float located at the top of the inlet passage allows fluid flow from the inlet passage into the outlet passage in the open position while blocking fluid flow from the outlet passage to the inlet passage in the closed position. Vent passages are provided above the float to enable communication of the outlet passage to atmosphere in the closed position. A handle is provided on the valve stem post to selectively rotate the latter to place the valve in open or closed position. A spline arrangment between the handle and the valve stem post requires the handle to be lifted to engage the valve stem post before rotating it.

14 Claims, 4 Drawing Sheets

ANTI-SYPHON FLUID CONTROL VALVE APPARATUS AND METHOD

This application is a divisional of application Ser. No. 08/110,089 filed Aug. 20, 1993, now U.S. Pat. No. 5,404,898.

FIELD OF THE INVENTION

The present invention relates to the field of valves for controlling fluid flow, and particularly to valves designed to control liquid flow and to prevent syphoning or back pressure.

BACKGROUND OF THE INVENTION

Control valves for various types of plumbing apparatuses are now required by code in many jurisdictions to incorporate anti-syphon features to prevent the contamination and/or pollution of the water supply. This is especially true in the case of household plumbing apparatuses in which a potable water supply is used, such as food or waste disposals which are driven by the pressure of the household water supply. The anti-syphon valve prevents the water which has been dischargedby the valve into the waste water system from re-entering and contaminating the water supply by, for example, a drop in pressure in the water supply causing such pressure to be lower than the pressure in the waste system, such as through a break in the water supply main.

Any valve which is used selectively to allow a pressured water supply to drive a food disposal must have selecting means for selectively allowing and preventing the water supply to reach the servo portion of the disposal apparatus. The selecting means must be easy to operate for a homemaker or other person using the disposal, but should be difficult for a child to do so in order to ensure the child's protection against injuring a hand or the like in the disposal. The valve also should incorporate means for venting or bleeding the fluid pressure in the apparatus to atmosphere in order to equalize pressure when the valve is not turned on.

Anti-syphon protected valves have various uses other than in directing pressured water for driving devices, including diverting bath water supply to a shower, placing chemical additives or the like in a fluid flowing from a supply for sterilization or enrichment, filling containers with liquid, and other applications requiring protection from contamination and/or pollution which will be readily apparent to those skilled in the art.

Anti-syphon and vacuum breaker valves which have been developed previously include the valve disclosed in U.S. Pat. No. 4,553,560 to Tucker et al., which describes a valve comprising a central inlet passage with a concentrically surrounding coaxial outlet passage, in which fluid from the inlet passage flows through a ball valve to its top, pushing up a cup-shaped float which seals the top of the inlet passage in the closed position and which directs the fluid into the outlet passage in the open position. The float is guided in its vertical movement by an attached rod sliding in an overlying cover. The ball valve must be accessed from the side and must use a central inlet passage.

Another float valve guided by a sliding rod is disclosed in U.S. Pat. No. 4,635,848 to Little. In both references, the float rises in the open position to seal off vent holes which communicate with the discharge outlet by means of a chamber surrounding the float. A similar sliding rod valve is disclosed in U.S. Pat. No. 2,990,843 to Smith.

Other types of anti-syphon valves are disclosed in U.S. Pat. No. 3,788,342 to Milette et al., which discloses a valve guided in its movement by the inlet passage, and U.S. Pat. Nos. 5,060,687 to Gayton and 5,038,814 to Gayton et al., which disclose valves using flexible diaphrams instead of floats.

Control valves used in water-powered food disposal systems are disclosed in U.S. Pat. Nos. 3,700,178 to Verley and 4,573,642 to Spelber.

OBJECTS AND SUMMARY OF THE INVENTION

It is therefore an object of the present invention to improve upon prior art anti-syphon valves.

It is a further object of the invention to provide a valve which can be accessed and operated from the top or the side, as desired by the manufacturer and as dictated by the particular application which may require a distinct valve size and shape.

It is a further object of the invention to provide a valve which can easily be modified to operate with varying orientations of inlet and outlet passages leading to and from the valve.

It is a further object of the invention to provide a valve which easily can be used by a homemaker or other adult while being difficult for children to use or abuse.

It is a further object of the invention to improve and make cheaper the design manufacture of floats in float-type anti-syphon valves and the housing around the float which must accommodate vents from atmosphere to the discharge passage in the closed position.

It is a further object of the invention to eliminate the need for ball-type valves for enabling or disabling the inlet supply pressure.

It is a further object of the invention to enable, if desired, the venting of the discharge passage through the selecting handle of an anti-syphon valve.

In accordance with a first aspect of the invention, an anti-syphon control valve comprises: an elongate inlet passage having a first end and a second end, the first end being adapted to receive fluid flow from a source, the fluid then flowing through the inlet passage and out the second end; an elongate outlet passage having a first end and a second end, the first end being disposed near the second end of the inlet passage; an elongate housing, having a first end and a second end, in which the second end of the inlet passage and the first end of the outlet passage are located, the inlet and outlet passages being disposed through the second end of the housing; a float disposed in the housing nearer the first end thereof than the first end of the inlet passage and adapted for lengthwise movement in the housing such that the float moves by a first force toward the second end of the housing and covers the second end of the inlet passage in the absence of fluid flow through the second end of the inlet passage, and such that the float moves by a second force comprising fluid flow against the float toward the first end of the housing thereby uncovering the second end of the inlet passage in the presence of fluid flow through the second end of the inlet passage; a float block against which the float presses when moving toward the first end of the housing by the second force; and a protrusion extending laterally from the float toward the housing, enabling continuous fluid communication between the first end of the outlet passage and the first end of the housing.

In accordance with a second aspect of the invention, an anti-syphon valve for fluid transfer comprises: an elongate inlet channel having first and second ends; an elongate outlet channel, disposed alongside the inlet channel, having first and second ends; a rotatable valve seat laterally disposed in the inlet and outlet channels between their ends, thereby dividing the inlet channel into a first section between its first end and the valve seat and a second section between its second end and the valve seat, and dividing the outlet channel into a first section between its second end and the valve seat and a second section between its first end and the valve seat, the valve seat being rotatable about an axis substantially parallel to the inlet and outlet channels and adapted to selectively close and open the inlet channel while leaving the outlet channel at least partially open in all rotational positions; and a float disposed near the second end of the inlet channel, adapted to cover the second end of the inlet channel when fluid pressure in the second section of the outlet channel exceeds or substantially equals fluid pressure in the second section of the inlet channel and uncover the second end of the inlet channel when fluid pressure in the second section of the inlet channel exceeds or substantially equals fluid pressure in the second section of the outlet channel.

In accordance with a third aspect of the invention, an anti-syphon fluid valve comprises: an elongate substantially cylindrical rotatable valve stem post having first and second ends; a valve seat fixedly secured inside the second end of the valve stem post and adapted for selective control of fluid flow by rotational position, the seat being rotatable with the rotation of the valve stem post; a substantially cylindrical handle of slightly greater diameter than the valve stem post disposed coaxially to the valve stem post and adapted for lengthwise movement relative thereto; a first protrusion extending outwardly from the wall of the valve stem post toward the handle; and a second protrusion extending inwardly from the wall of the handle toward the valve stem post in a different lengthwise position than the first protrusion in at least one lengthwise position of the handle relative to the valve stem post, whereby the handle can be vertically moved to engage the first and second protrusions such that rotation of the handle causes corresponding rotation of the valve stem post.

In accordance with a fourth aspect of the invention, a method of enabling fluid from an inlet channel selectively to enter an outlet channel through an intermediate chamber and preventing fluid from the outlet channel to enter the inlet channel, comprises the steps of: with fluid pressure in the inlet channel greater than fluid pressure in the outlet channel, partially blocking the outlet channel with a valve seat while causing the valve seat to leave the inlet channel free, enabling fluid to flow from the greater pressure in the inlet channel to the lower pressure in the outlet channel; substantially completely blocking the inlet channel with a float in the circumstance of momentary reversal of the pressure differential between the inlet channel and outlet channel, such that the greater fluid pressure in the outlet channel is unable to force fluid into the inlet channel with lesser fluid pressure; with fluid pressure in the inlet channel greater than fluid pressure in the outlet channel, partially blocking the outlet channel with the valve seat while substantially completely blocking the inlet channel with the valve seat, preventing fluid from flowing from the greater pressure in the inlet channel to the lower pressure in the outlet channel; and with the valve seat partially blocking the outlet channel and substantially completely blocking the inlet channel, substantially completely blocking the inlet channel with the float.

Specifically, and in a preferred embodiment, an anti-syphon fluid valve comprises: an elongate inlet pipe leg with upper and lower ends; an elongate outlet pipe leg with upper and lower ends; wherein the inlet and outlet legs are joined together at their upper ends, forming a base pipe with their combination, each leg being approximately in the shape of a semi-circle and in volume substantially half of the base pipe; a separating wall between the inlet and outlet legs in the base pipe; a lower seat overlying the upper ends of the inlet and outlet legs, the lower seat comprising a semi-circular outlet opening overlying the upper end of the outlet leg and a quarter-circular inlet opening overlying the upper end of the inlet leg, with the rest of the upper end of the inlet leg being covered by a quarter-circular solid section of the lower seat; an upper seat overlying the lower seat, the upper seat comprising a circular section divided into oppositely oriented solid quarter-circular blocks and oppositely oriented quarter-circular openings; an elongate valve stem post having an upper and lower end, the upper seat being affixed at the lower end, extending substantially parallel to the base pipe; an elongate inlet passage disposed within the valve stem post and having upper and lower ends, the lower end being situated over the inlet opening of the lower seat and the upper end being disposed in the approximate cross-sectional center of the valve stem post; a metering peg extending from the valve stem post through the upper seat to the lower seat; an elongate outlet passage disposed within the valve stem post and having upper and lower ends, the lower end being situated over the outlet opening of the lower seat and the upper end being annular and disposed concentrically with the upper end of the inlet passage; a float disposed in the valve stem post above the upper end of the inlet passage and adapted to descend by force of gravity over the upper end and seal it in the absence of countervailing forces; a plurality of ribs extending laterally from the float to the valve stempost; a float block disposed over the float and secured within the valve stem post such that the float presses against the float block when forced from its position on the upper end of the inlet passage; a vent hole disposed in the float block within the area of contact of the float against the float block; a substantially cup-shaped handle disposed over the upper end of the valve stem post, the handle comprising vent passages in fluid communication with the vent hole in the float block, and being adapted for lengthwise movement along the valve stem post; a plurality of first splines arranged substantially annularly around the valve stem post and protruding outwardly therefrom toward the handle; and a plurality of second splines arranged substantially annularly around the handle and protruding inwardly therefrom toward the valve stem post, being adapted selectively to engage the first splines such that a user can rotate the valve stem post through the handle.

BRIEF DESCRIPTION OF THE DRAWINGS

These and other objects, aspects, and embodiments of the present invention will be described with reference to the attached drawing figures, of which.

DETAILED DESCRIPTION OF THE INVENTION

Figure 1:
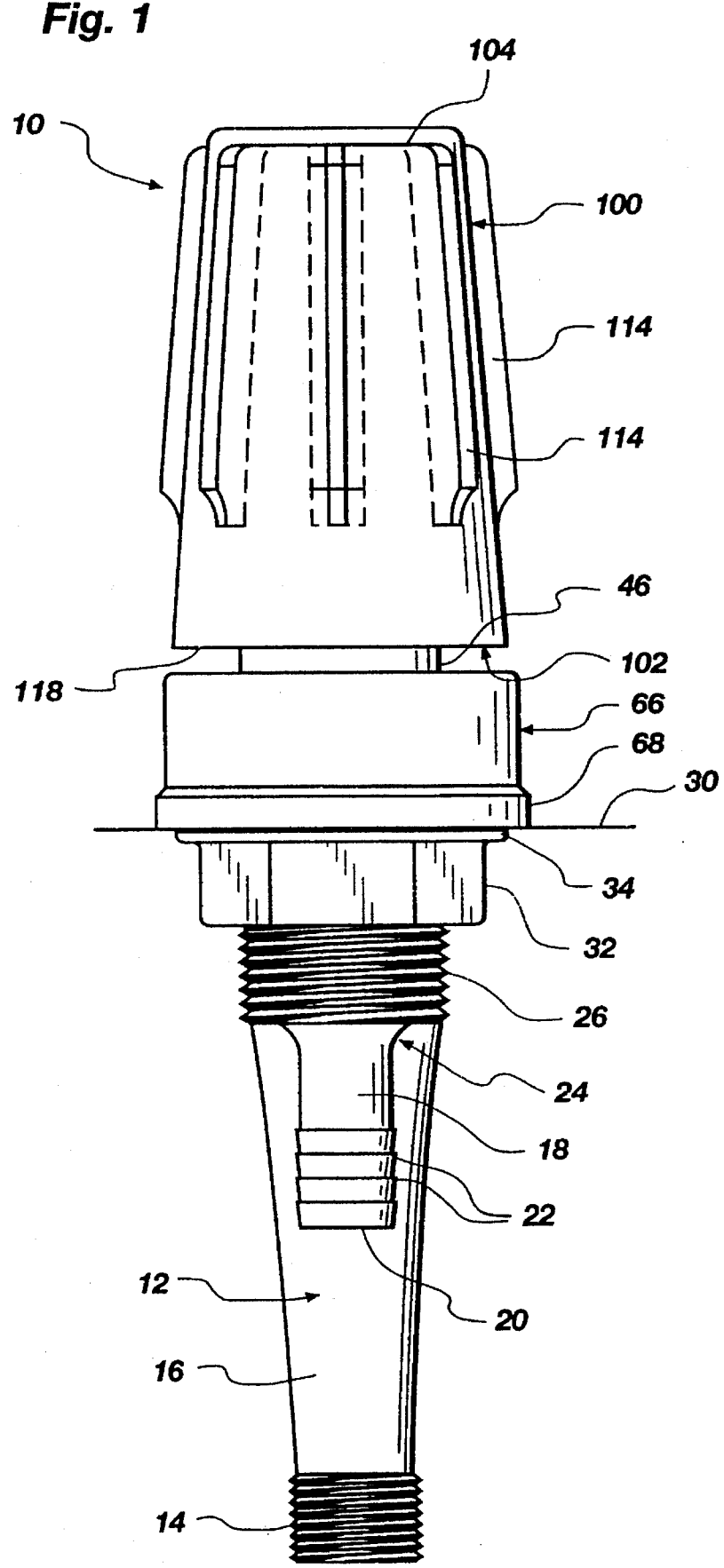
FIG. 1 is a side elevational view of an example of an anti-syphon fluid control valve according to the present invention.

Referring now to the figures, an example of an anti-syphon fluid control valve 10 according to the present invention is shown. The valve 10 is intended for use in connection with a water pressure-powered food disposal unit (not shown), but can be used for any application in which it is desired to selectively tap a water supply source while avoiding syphoning effects.

The valve 10 has an elongate inlet pipe leg 12 leading from a suitable water source, such as, in its particular intended application, a household potable water source. The inlet leg 12 is threaded, e.g., with one-half inch IPS threads, at its supply end 14 for connection to a standard water supply pipe found under household kitchen sinks. The supply end 14 alternatively can be fashioned for connection to any fluid source desired. At its supply end 14, the inlet leg 12 is substantially circular in cross-section, while at its midsection 16 it is substantially oval to accommodate an adjacent outlet pipe leg 18, which at its discharge end 20 has ridges or barbs 22 to enable secure connection to the destination device of the fluid, a food disposal in the illustrated embodiment, by means of rubber tubing or similar structure. The discharge end 20 of the outlet pipe leg 18 is substantially circular in cross-section.

Figure 3:
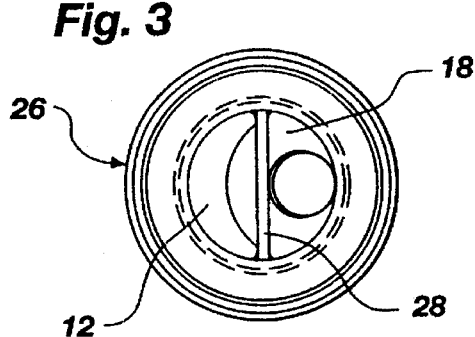
FIG. 3 is a view in cross-section along line 3—3 of FIG. 2, showing the inlet and outlet portions of the base pipe.

The inlet leg 12 and the outlet leg 18 join at a point 24 to form a dual-path valve base pipe 26, substantially circular in cross-section, with the inlet leg 12 and the outlet leg 18 each being disposed therein, each comprising approximately half of the base pipe 26, and each being substantially semi-circular in cross-section with a separating wall 28 between them, as shown particularly in FIG. 3. The base pipe 26 is threaded to secure it to an anchor 30 which, in the illustrated embodiment, is a sink or countertop. The base pipe 26 is secured to the anchor 30 by inserting it through a suitably sized hole in the anchor 30, screwing a base nut 32 onto the threads of the base pipe 26, and tightening it under the anchor 30. A base washer 34, rubber in a preferred embodiment, is placed between the base nut 32 and the anchor 30 for further security. The base pipe 26 and inlet and outlet legs 12 and 18 are constructed of moldable materials, but may be of iron or brass in a preferred embodiment.

The base pipe 26 tightens against the top of the anchor 30 by an increase of the diameter of its upper portion 36, which forms an external shoulder 38 which provides an opposing force to the base nut 32 on the anchor 30. The increased diameter of the upper portion 36 also forms an internal shoulder on which is disposed a cylindrical lower seat 40. The lower seat 40 preferably comprises a seat of moldable material or a ceramic disc which is fixedly, i.e., non-movably, secured into the inner diameter of the upper portion 36 of the base pipe 26. As particularly illustrated in FIG. 4, the lower seat 40 includes an inlet opening 42 and outlet opening 44 which correspond to and overlie the inlet leg 12 and outlet leg 18, respectively, of the base pipe 26. The outlet opening 44 in the lower seat 40 corresponds substantially exactly in size, semi-circular shape, and latitudinal placement to the outlet leg 18, while the inlet opening 42 is in the shape of a quarter-circle and thus corresponds to half of the inlet 12, while the other half of the inlet 12 is covered by a quarter-circular solid block 45. The openings in the lower seat 40 may be viewed as comprising the openings of the inlet leg 12 and outlet leg 18, since the lower seat 40 is fixed in its position above the inlet and outlet by an extension of a dividing wall 35 tightly fitting into a recess 41 in lower seat 40, and indeed the lower seat 40 may be made integral with the base pipe 26, if desired.

A cylindrical valve stem post 46 is disposed inside the larger-diameter upper base pipe 36 with the outer wall of the valve stem post 46 pressing snugly against the inner wall of the upper base pipe 36 and its lower end 48 pressing down against the lower seat 40. O-rings 50, two in the illustrated embodiment, are disposed in grooves in the outer wall of the valve stem post 46 and between the inner wall of the upper base pipe 36 to seal the juncture against water leakage. The valve stem post 46 is constructed of brass or moldable materials and may include brass inserts for the threaded portions.

An upper seat 52 is disposed securely within the lower end 48 of the valve stem post 46. The upper seat 52 is secured in the valve stem post 46 by pressure from below by the lower seat 40, pressure from above by an annular shoulder 54 formed in the inner wall of the valve stem post 46, and circumferential pressure against the inner wall of the valve stem post 46. Lateral pressures and slippage of upper seat 52 within the valve stem post 46 during rotation are substantially eliminated by an extension of dividing wall 53 being tightly fitted into a recess 61 and a convex extension of the dividing wall 53 being tightly fitted into a recess 61 and a convex extension of a metering peg 51 formed in the inner wall of the lower end 48 of the valve stem post 46 corresponding to a notch 57 in the upper seat 52.

To ensure the proper alignment of the upper seat 52 to the lower seat 40, a metering slot 43 is used to guide the corresponding metering peg 51 which extends past the lower valve stem post 48 into the lower seat 40.

Figure 6:
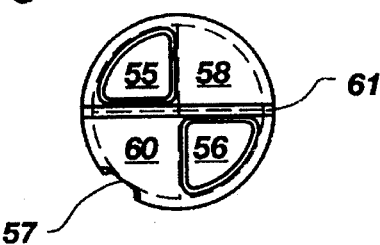
FIG. 6 is a view in cross-section of the upper seat in the open position.
Figure 5:
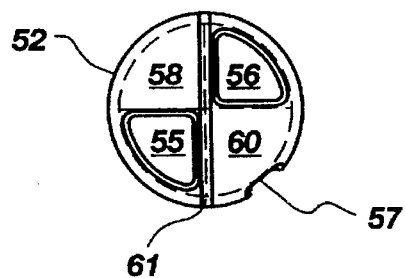
FIG. 5 is a view in cross-section along line 5—5 of FIG. 2, showing the upper valve seat in the closed position.

As shown in FIGS. 5 and 6, the upper seat 52 comprises a solid quarter-circular inlet block 58 and solid quarter-circular outlet block 60 designed for selective placement over the inlet opening 42 and outlet opening 44, respectively, of the lower seat 40. A slot 61 accepts an extension of the dividing wall 53 as well as the slot 57 an extension of the metering peg 51 to facilitate rotation.

When the upper seat 52 is in the closed position, as illustrated in FIG. 5, the inlet block 58 substantially completely blocks the inlet opening 42, thereby preventing the entry of fluid into the valve stem post 46, while the outlet block 60 blocks only substantially half of the outlet opening 44, thereby leaving the latter open. When the upper seat 52 is in the open position, as illustrated in FIG. 6, the inlet block 60 is located over the block 45 on the lower seat 40, leaving the inlet opening 42 open, and the outlet block 58 blocks the opposite half of the outlet opening 44 from the half blocked in the closed position, thereby continuing to leave the outlet opening 44 open. The upper seat 52 is rotated one-quarter revolution, i.e., 90 degrees, to go from the closed position to the open position and vice versa.

Figure 4:
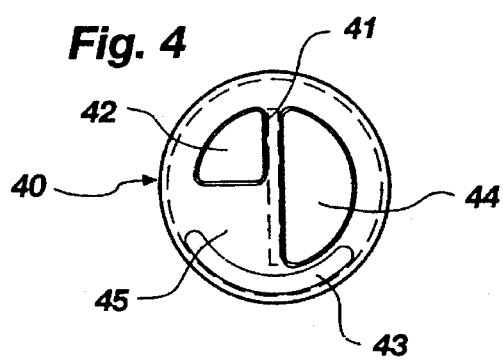
FIG. 4 is a view in cross-section along line 4—4 of FIG. 2, showing the inlet and outlet through the lower valve seat.

As illustrated in FIGS. 4–6, the use of the metering peg 51 in relation to the upper and lower seats 52 and 40 can be realized in the following way. The upper valve stem post 46 is rotated 90 degrees from closed position in FIG. 5 to open position in FIG. 6. The upper extension of the metering peg 51 is embodied in the inner wall of the lower end 48 of the valve stem post 46 and the corresponding notch 57 can be seen on the solid block 60 of the upper seat 52 being disposed in this lower end 48. The scope of rotation of the valve stem post 46 is defined by the extension of the peg 51 as it glides within the confines of the metering slot 43 located in the upper end of the lower seat 40. In this way the valve stem post 46 can be rotated any degree between zero and 90 degrees, correspondingly metering the flow of fluid therein.

It will be appreciated by those skilled in the art that the upper and lower seats 52 and 40 can be modified relatively easily to accommodate different arrangements such as varying shapes and orientations of inlet and outlet legs and base pipes, by changing the seats 52 and 40 in accordance with such variations.

A flange 62 extends from the outer wall of the valve stem post 46 just above the top of the upper base pipe 36. The flange 62 abuts the upper and inwardly extending flange 64 of a substantially cylindrical escutcheon 66 and is pressed down by it, securing it in position against the lower seat 40 and within the upper base pipe 36. The escutcheon 66 has a lower outwardly extending flange 68 which abuts the anchor 30, and a threaded portion 70 near the lower flange 68 on its inner wall which engages corresponding threads on the outer wall of the upper base pipe 36 to secure the escutcheon 66 in position. The escutcheon 66 serves to protect the juncture of the valve stem post 46 and the upper base pipe 36 as well as secure the valve stem post 46 in position.

Figure 7:
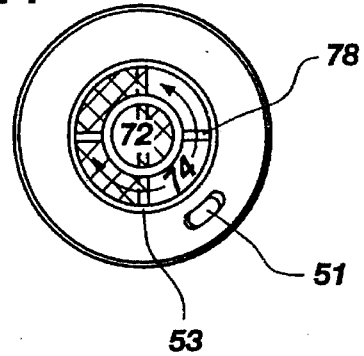
FIG. 7 is a view in cross-section along line 7—7 of FIG. 2, showing the upper valve stem post in closed position relative to the lower valve seat.
Figure 8:
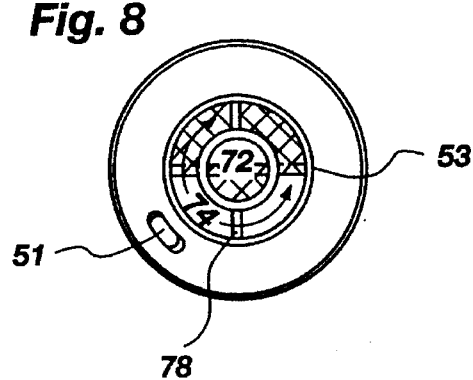
FIG. 8 is a view in cross-section showing the upper valve stem post in open position relative to the lower valve seat.

As particularly illustrated in FIGS. 7 and 8, the lower valve stem post 46 contains an inlet passage 72 and an outlet passage 74, each of which are semi-circular with a separating wall 53 between them, similar to the arrangement of tile inlet leg 12 and outlet leg 18 in the base pipe 26. The inlet passage 72 is placed over tile inlet opening 42 and block 45 in the lower seat 40, with the upper seat 52 between them, and the outlet passage 74 is placed over the outlet opening 44 in the lower seat 40, also with the upper seat 52 between them. The inlet and outlet passages 72 and 74 may be viewed merely as continuations of the inlet and outlet legs 12 and 18 with the upper seat 52 being disposed in their midsections.

Figure 9:
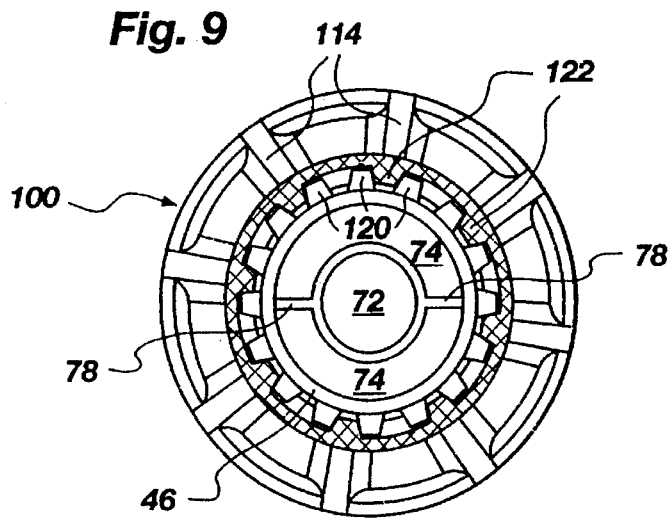
FIG. 9 is a view in cross-section along line 9—9 of FIG. 2, showing the handle and upper valve stem post.

As the passages 72 and 74 extend upwardly in the valve stem post 46, they change shape and location such that at their upper ends they are coaxial, with the passage 72 comprising a circle in cross-section inside the cross-sectional circle of the passage 74, as illustrated in FIG. 9. The outlet passage 74 is annular and surrounds the inlet passage 72 at the tops of the passages. Braces 78 extend inwardly from the wall of the valve stem post 46 to the inlet passage 72 near its top to support the passage 72.

A float 82 is disposed in the valve stem post 46 above the top of the inlet passage 72. The float 82 is cylindrical in a preferred embodiment, with a flat float seal 84 being affixed to or formed on its top to create a water-tight seal with a float block 86 disposed above it. To carry out its function, the float seal 84 preferably is constructed of cork or similar material, or circular ridges molded from the material of the float 82, which readily seal against a suitably smooth surface.

A plurality of vertical fins or ribs 88 are disposed on the sides of the float 82 to enable it easily to slide up and down within the valve stem post 46 and provide for fluid communication between the outlet passage and venting passages disposed in the top of the valve stem post 46 and handle, as described below. Though a plurality of ribs 88 is preferred, one rib would suffice to provide said venting communication. Though the illustrated vertical elongate construction of the ribs 88 is preferred, the ribs 88 alternatively can comprise protrusions or projections from the float 82 toward the wall of the valve stem post 46 of any desired shape. It can be seen that the ribs 88 between the float 82 and valve stem post 46 extend through a chamber 89 between the float 82 and valve stem post 46.

The float 82 is solid except for a disc-shaped recess 90 on its lower surface which is slightly larger in diameter than the inlet passage 72, making the float 82 substantially cup-shaped. The float 82, including the ribs 88, is preferably constructed of suitably light and rigid plastic or zinc or other suitable material to enable it easily to move vertically within the valve stem post 46 under fluid pressure from the inlet passage 72, or outlet passage 74 in the case of backflow pressure, and particularly to descend under the force of gravity over the top of the inlet passage 72 in the absence of fluid pressure from the passages 72 and 74.

It can be seen that the float 82 and ribs 88 define the chamber in the valve stem post 46 in which they move, with no need to make a larger chamber for venting purposes as in the prior art, since venting occurs through the ribs 88. There is also no need to fashion a guiding rod through the float block 86 or similar arrangement to guide the float 82 in its vertical movement, as in the prior art, since the ribs 88 alone guide the float 82 along the walls of the valve stem post 46.

Figure 2:
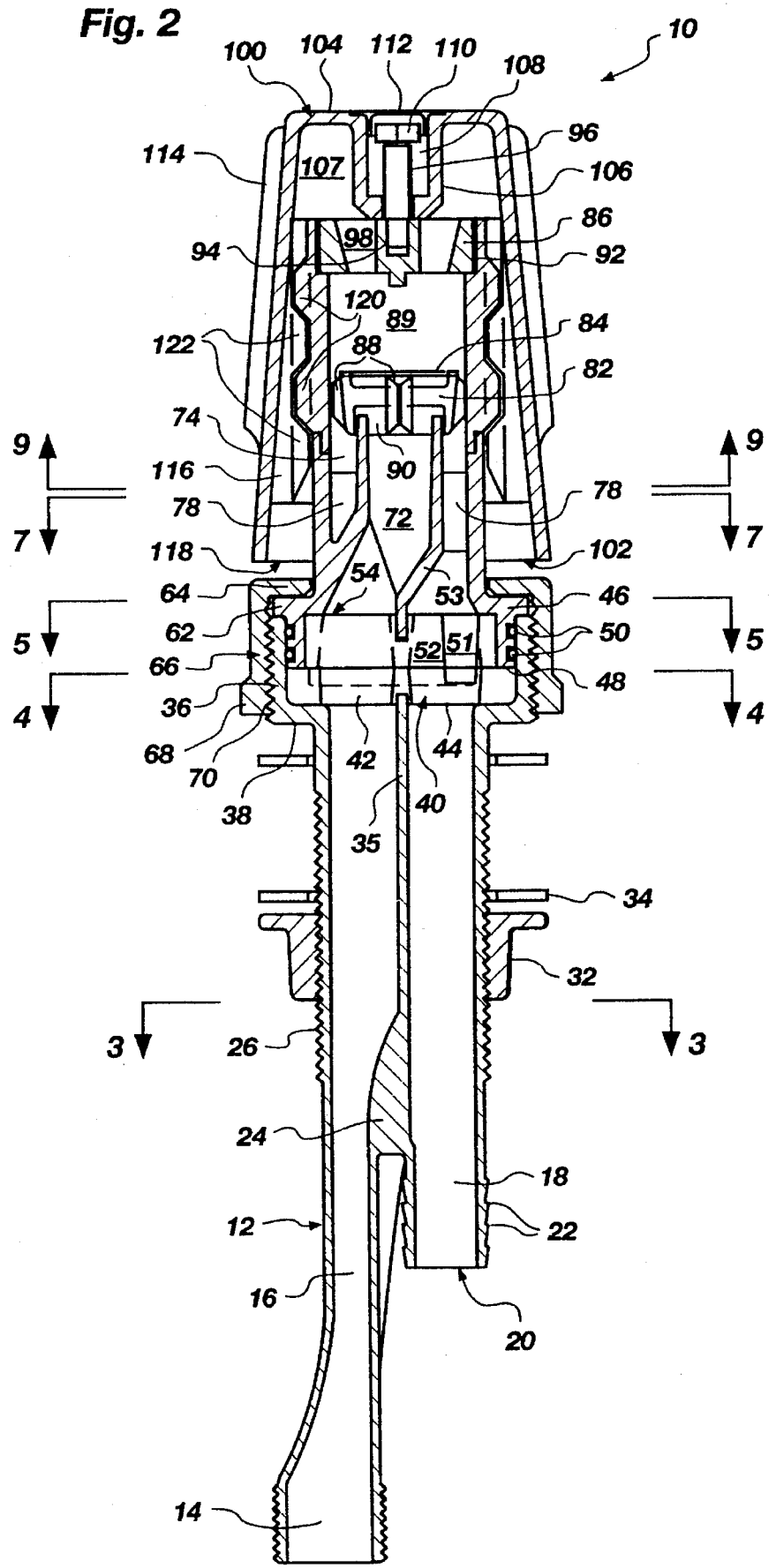
FIG. 2 is a side view in cross-section of the valve of FIG. 1 in closed position.

In the closed position, as shown in FIG. 2, the float 82 is located over the inlet passage 72 such that the recess 90 is snugly disposed over the top of the inlet passage 72, preventing fluid transfer thereinto. In this position, no fluid is flowing from the inlet passage 72 and the float 82 is forced onto the top of the inlet passage 72 under the force of gravity. In the case of greater pressure of the outlet passage 74 than pressure in the inlet passage 72, the differential pressure contributes to the seating of the float 82 on the top of the inlet passage 72. Other sources of force may also be used to seat the float 82 on the top of the inlet passage 72, if desired, such as a spring or the like.

Figure 10:
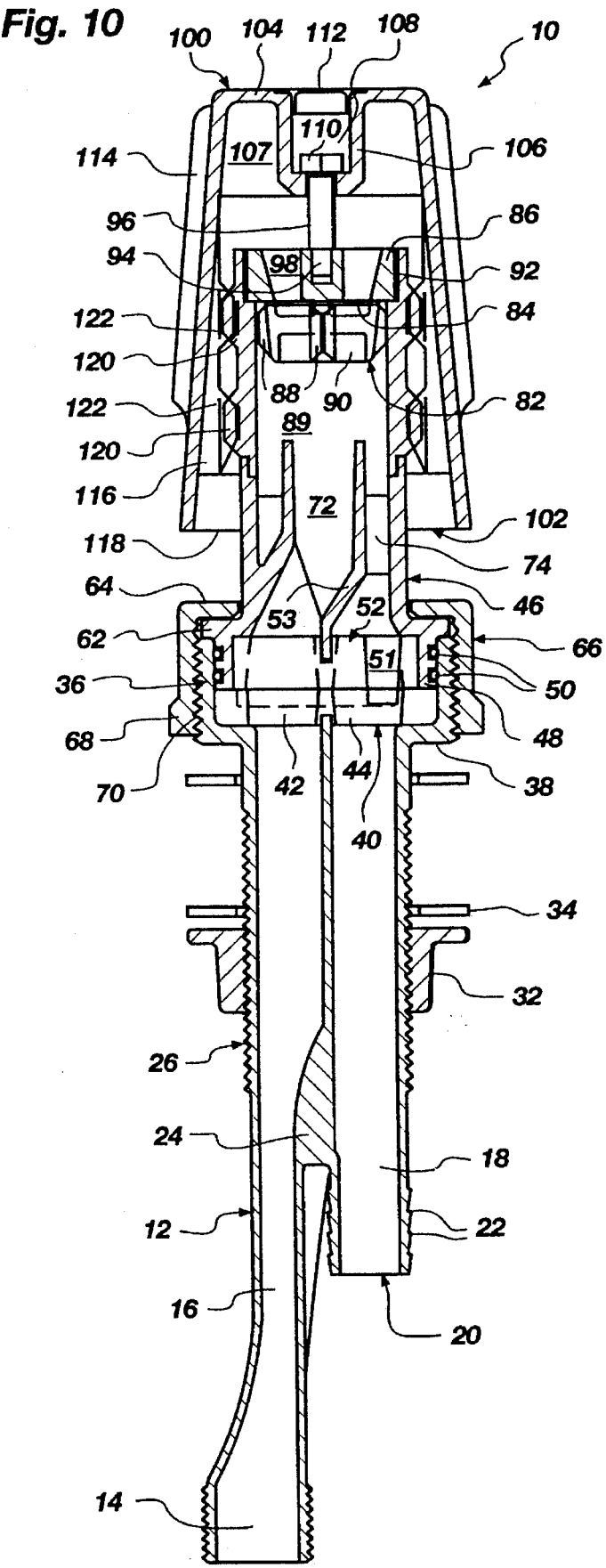
FIG. 10 is a side view in cross-section of the valve of FIG. 1 in open position, with the handle engaging the valve stem post.

In the open position, as shown in FIG. 10, the float 82 is located above the top of the inlet passage 72, abutting and sealing against the bottom of the float block 86 and allowing fluid transfer through the top of the inlet passage 72. The cupped shape of the float 82 facilitates the transfer of movement of the fluid from its upward exit from the inlet passage 72 to its downward entry into the outlet passage 74.

The float block 86 comprises a cylindrical disc threaded on its outer wall 92 to secure it to the inner wall of the valve stem post 46, which is correspondingly threaded near its top where the float block 86 is located. A vertical threaded hole 94 is disposed in the center of the float block 86 to accommodate a handle guide screw 96 which threads into the hole 94 and protrudes above it into the handle. A plurality of vent or bleed holes 98 extend through the float block 86 at a radius not greater than the radius of the float seal 84 on the float 82, such that the float seal 84 seals the bleed holes 98, preventing fluid transfer therethrough, when the valve is in the open position, as can be seen particularly in FIG. 10.

The handle 100 of the valve 10 is disposed over the top of the valve stem post 46 and is generally cylindrical with an open bottom end 102 and a closed top end 104, making it substantially cup-shaped. An abutment 106 protrudes downwardly from the top end 104 of the handle 100 and contacts the top of the float block 86, as shown in FIG. 2, though it does not contact the float block 86 when the handle 100 is being used to rotate the valve stem post 46, as shown in FIG. 10. An annular vent chamber 107 is formed inside the top of the handle 100 by the protrusion of the abutment 106. The abutment 106 is hollow and open at the top and the handle guide screw 96 protrudes through a hole 108 in the bottom thereof. The abutment 106 slides vertically along the handle guide screw 96, being limited in its downward motion by its contact with the top of the float block (FIG. 2) and in its upward motion by the contact of the head 110 of the guide screw against the bottom of the abutment 106 (FIG. 10). A button 112 is secured in the open top of the abutment 106.

The handle 100 contains vertical ribs 114 which extend from its bottom end 102 to near its top end 104. The ribs 114 enable the user easily to grasp and turn the handle 100 to rotate it to the open or closed position. Additionally, the ribs 114 contain vent passages 116 in communication with the annular vent chamber 107 in the top of the handle 100, which vent passages 116 extend from the chamber 107 to open bottom ends 118, at the bottom end 102 of the handle 100, which are in communication with the open air.

Two sets of splines 120 are located in annular arrangement, one above the other, on the outside wall of the valve stem post 46, as shown in FIG. 10. Each set of splines includes a plurality of splines spaced from one another along the circumference of the valve stem post 46. The handle 100 contains two sets of splines 122, corresponding to the valve stem splines 120, protruding from the inside wall of the handle 100. The handle splines 122 are located below and between the valve stem splines 120 when the handle is in resting position, FIG. 2, enabling the handle 100 to rotate freely on the valve stempost 46 in the resting position. When it is desired to rotate the valve stem post 46 to the open or closed position, the handle 100 is lifted, FIG. 10, causing the handle splines 122 to engage the valve stem splines 120 and enabling the user to rotate the valve stem post 46 through the handle 100. The handle 100 can be lifted no farther than its limit defined by the head 110 of the handle guide screw 96 contacting the bottom of the abutment 106, which is preferably calibrated to correspond to the engagement placement of the splines 120 and 122 with each other. Thus the handle 100 is resistant to rotation of the valve stem post 46 and abuse by children.

In operation, when it is desired to place the valve 10 in the closed position and prevent fluid from entering the outlet passage 74 from the inlet passage 72, the handle 100 is lifted to engage the handle splines 122 with the valve stem splines 120, as shown in FIG. 10. The handle is then rotated, thus rotating the valve stem post 46 and upper seat 52 relative to the fixed lower seat 40. The rotation continues until the position of the upper seat 52 shown in FIG. 5 and valve stem post 46 shown in FIG. 7 is reached in which the inlet block 58 covers the inlet opening 42 in the lower seat 40, preventing flow from the fluid source to which the inlet leg 12 is connected. The outlet block 60 only partially covers the outlet opening 44, enabling fluid communication between the outlet leg 18 and the outlet passage 74.

In the closed position, the float 82 descends and covers the top of the inlet passage 72 under the force of gravity, combined with any possible fluid pressure in the outlet passage 74 not handled by venting to atmosphere. The vent holes 98 are uncovered, enabling fluid communication from the outlet passage 74 through the chamber 89 and vent holes 98 to the vent chamber 107 in the top of the handle 100 and through the vent passages 116 in the ribs 114 of the handle 100 to atmosphere. The pressure in the outlet passage 74 and outlet leg 18 is thus equalized to atmosphere in the closed position.

When it is desired to place the valve 10 in the open position, causing fluid from the supply source to go through the valve into the outlet leg 18, the handle 100 is again lifted and rotated, but rotated this time to the position shown in FIG. 6 and FIG. 8 in which the inlet block 58 in the upper seat 52 partially covers the outlet opening 44 in the lower seat 40 instead of the inlet opening 42, thus allowing fluid to flow from the inlet leg 12 through inlet openings 42 and 55 into the inlet passage 72. The construction of the upper and lower seats 52 and 40 require a rotation of approximately a quarter revolution, i.e., 90 degrees, between closed and open positions.

In the open position, fluid flows from the inlet passage 72 and pushes the float 82 off its top and against the float block 86, blocking the vent holes 98 and preventing fluid flow into atmosphere, which obviously is necessary to keep fluid from spilling out of the valve onto a kitchen counter or the like. The fluid then enters the intermediate chamber 89 and outlet passage 74, faciliated by the cup-shaped float 82, through the outlet openings 56 and 44 and outlet leg 18 to an attached device such as a food disposal.

If there is a decrease in pressure in the inlet passage 72 such that the fluid pressure in the outlet passage 74 exceeds the pressure in the inlet passage 72 while the valve 10 is in the open position, the reversed pressure differential will release the float 82 from its position against float block 86 allowing it to drop through intermediate chamber 89 to rest over the top of inlet passage 72, preventing backflow of water from the outlet passage 74 to the inlet passage 72 and therethrough to the water supply, thus avoiding its contamination.

It will be appreciated that the described example of an anti-syphon valve is only one embodiment of the present invention. Modifications and additions to the described embodiment can be made while remaining within the scope of the invention, such as by varying materials, sizes, shapes, and details of construction. Other embodiments will be apparent to those skilled in the art in light of this disclosure while remaining within the scope of the appended claims.

I claim:

1. An anti-syphon control valve comprising:

an elongate inlet passage having a first end and a second end, the first end being adapted to receive fluid flow from a source, the fluid then flowing through the inlet passage and out the second end;

an elongate outlet passage having a first end and a second end, the first end being disposed near the second end of the inlet passage;

an elongate housing, having a first end and a second end, in which the second end of the inlet passage and the first end of the outlet passage are located, the inlet and outlet passages being disposed through the second end of the housing;

a float disposed in the housing nearer the first end thereof than the first end of the inlet passage and adapted for lengthwise movement in the housing such that the float moves by a first force toward the second end of the housing and covers the second end of the inlet passage in the absence of fluid flow through the second end of the inlet passage, and such that the float moves by a second force comprising fluid flow against the float toward the first end of the housing thereby uncovering the second end of the inlet passage in the presence of fluid flow through the second end of the inlet passage;

a float block against which the float presses when moving toward the first end of the housing by the second force;

a protrusion extending laterally from the float toward the housing, enabling continuous fluid communication between the first end of the outlet passage and the first end of the housing;

a valve seat means disposed between the two ends of the inlet and outlet passages for selective blocking of the inlet passage, wherein the valve seat means is rotatable along an axis parallel to the housing.

2. The valve of claim 1 wherein the valve seat means is rotatable to a plurality of rotational positions along an axis parallel to the housing and further comprises block means for continual partial blocking of the outlet passage in any rotational position.

3. The valve as in claim 3, wherein the first end of the housing is closed by the float block and wherein the float block contains a vent hole located in the float block such that the hole is blocked by the float when the latter presses against the float block, and such that the hole is not blocked by the float when the float is not pressing against the float block and is therefore in fluid communication with the outlet passage.

4. The valve of claim 3, further comprising a handle disposed over the float block and first end of the housing and comprising vent passages in fluid communication with the vent hole in the float block.

5. The valve stem of claim 1, further comprising:

a lower stationary base section coupled to the inlet passage so as to reside between the valve seat means and said inlet passage and having a slot formed therein;

an upper rotational valve stem post coupled to the valve seat means and being rotatably disposed relative to the lower stationary base section such that the valve seat means is confined to rotational movement with said upper rotational valve stem post;

a peg extending from the upper rotational valve stem post into the slot formed in the lower stationary base section and being moveable within said slot such that the valve seat means is thereby internally aligned and metered relative to said slot.

6. An anti-syphon valve for fluid transfer comprising:

an elongate inlet channel having first and second ends;

an elongate outlet channel, disposed alongside the inlet channel, having first and second ends;

a rotatable valve seat means laterally-disposed in the inlet and outlet channels between their ends, thereby dividing the inlet channel into a first section between its first end and the valve seat means and a second section between its second end and the valve seat means, and dividing the outlet channel into a first section between its second end and the valve seat means and a second section between its first end and the valve seat means, the valve seat means being rotatable about an axis substantially parallel to the inlet and outlet channels for selectively closing and opening the inlet channel while leaving the outlet channel at least partially open in all rotational positions;

a float disposed near the second end of the inlet channel, adapted to cover the second end of the inlet channel when fluid pressure in the second section of the outlet channel exceeds or substantially equals fluid pressure in the second section of the inlet channel and uncover the second end of the inlet channel when fluid pressure in the second section of the inlet channel exceeds or substantially equals fluid pressure in the second section of the outlet channel.

7. The valve of claim 6 wherein said valve seat means comprises a first section disposed in proximity to and toward the inlet channel and the outlet channel and a second section disposed opposite said first section further comprising a metering peg extending through the first section of the valve seat means, and integral in movement therewith, to the second section of the valve seat means and in sliding engagement therewith.

8. The valve of claim 6 wherein the inlet and outlet channels are each substantially semi-circular in cross-section and adjacent one another along their flat walls, thus forming an approximate circle in total cross-section, and wherein the valve seat is substantially disc-shaped corresponding in diameter and lateral placement to the cross-sectional circle of the inlet and outlet channels, the outlet channel having an opening onto the valve seat which is substantially semi-circular and the inlet channel having an opening onto the valve seat which is substantially quarter-circular.

9. The valve of claim 8 wherein the valve seat comprises two diametrically opposed quarter circular openings adapted for selective placement over the inlet and outlet openings.

10. The valve of claim 9 wherein the valve seat is a ceramic disc.

11. The valve of claim 9 wherein the valve seat comprises moldable materials.

12. The valve of claim 6 wherein the valve seat means is rotatable along an axis parallel to the inlet channel and the outlet channel so as to selectively close the inlet channel in at least one rotational position while keeping the outlet channel am least partially open in all rotational positions.

13. The valve of claim 12 wherein the float covers the second end of the inlet channel when the inlet channel is closed by the rotational position of the valve seat.

14. An anti-syphon fluid valve comprising:

an elongate inlet pipe leg with upper and lower ends;

an elongate outlet pipe leg with upper and lower ends;

wherein the inlet and outlet legs are joined together at their upper ends, forming a base pipe with their combination, each leg being approximately in the shape of a semi-circle and in volume substantially half of the base pipe;

a separating wall between the inlet and outlet legs in the base pipe;

a lower seat overlying the upper ends of the inlet and outlet legs, the lower seat comprising a semi-circular outlet opening overlying the upper end of the outlet leg and a quarter-circular inlet opening overlying the upper end of the inlet leg, with the rest of the upper end of the inlet leg being covered by a quarter-circular solid section of the lower seat;

an upper seat overlying the lower seat, the upper seat being rotatable about a common axis extending through the approximate centers of the upper and lower seats, the upper seat comprising a circular section divided into oppositely oriented solid quarter-circular blocks and oppositely oriented quarter-circular openings and having a slot extending along its periphery;

a peg extending through the slot in the upper seat and movably engaging the lower seat;

an elongate valve stem post having an upper and lower end, the upper seat being affixed at the lower end, extending substantially parallel to the base pipe;

an elongate inlet passage disposed within the valve stem post and having upper and lower ends, the lower end being situated over the inlet opening of the lower seat and the upper end being disposed in the approximate cross-sectional center of the valve stem post;

an elongate outlet passage disposed within the valve stem post and having upper and lower ends, the lower end being situated over the outlet opening of the lower seat and the upper end being annular and disposed concentrically with the upper end of the inlet passage;

a float disposed in the valve stem post above the upper end of the inlet passage and adapted to descend by force of gravity over the upper end and seal it in the absence of countervailing forces;

a plurality of ribs extending laterally from the float to the valve stem post;

a float block disposed over the float and secured within the valve stem post such that the float presses against the float block when forced from its position on the upper end of the inlet passage;

a vent hole disposed in the float block within the area of contact of the float against the float block;

a substantially cup-shaped handle disposed over the upper end of the valve stem post, the handle comprising vent passages in fluid communication with the vent hole in the float block, and being adapted for lengthwise movement along the valve stem post;

a plurality of first splines arranged substantially annularly around the valve stem post and protruding outwardly therefrom toward the handle;

a plurality of second splines arranged substantially annularly around the handle and protruding inwardly therefrom toward the valve stem post, being adapted selectively to engage the first splines such that a user can rotate the valve stem post through the handle.

\* \* \* \* \*